US009111361B1

(12) United States Patent
Higgins

(10) Patent No.: US 9,111,361 B1
(45) Date of Patent: Aug. 18, 2015

(54) DISTINGUISHING BETWEEN MOVING TARGETS AND CLUTTER IN A VIDEO

(71) Applicant: The Boeing Company, Chicago, IL (US)

(72) Inventor: Robert P. Higgins, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 142 days.

(21) Appl. No.: 13/774,445

(22) Filed: Feb. 22, 2013

(51) Int. Cl.
*G06T 7/20* (2006.01)
*G06K 9/78* (2006.01)

(52) U.S. Cl.
CPC .............. *G06T 7/2053* (2013.01); *G06K 9/78* (2013.01); *G06K 2209/21* (2013.01); *G06T 2207/10016* (2013.01); *G06T 2207/10032* (2013.01); *G06T 2207/30212* (2013.01)

(58) Field of Classification Search
CPC ................. G06T 7/2053; G06T 2207/10016; G06T 2207/10032; G06T 2207/30212; G06K 2209/21
See application file for complete search history.

(56) References Cited

U.S. PATENT DOCUMENTS

| | | | | |
|---|---|---|---|---|
| 5,109,435 A | * | 4/1992 | Lo et al. | 382/103 |
| 6,236,749 B1 | * | 5/2001 | Satonaka et al. | 382/154 |
| 7,359,555 B2 | * | 4/2008 | Porikli et al. | 382/204 |
| 8,306,265 B2 | * | 11/2012 | Fry et al. | 382/103 |
| 8,611,600 B2 | * | 12/2013 | Newman et al. | 382/103 |
| 2013/0216144 A1 | * | 8/2013 | Robinson et al. | 382/233 |

OTHER PUBLICATIONS

Ying et al., "Unknown Moving Target Detecting and Tracking Based on Computer Vision", Image and Graphics, 2007. ICIG 2007. Fourth International Conference on, 490-495.*
Vacha et al., "Colour and rotation invariant textural features based on Markov random fields", Pattern Recognition Letters 32 (2011) 771-779.*
Wang et al., "Clutter-adaptive infrared small target detection in infrared maritime scenarios", Jun. 2011, Optical Engineering 50(6), 067001-1-067001-12.*
Flusser et al., "Rotation Moment Invariants for Recognition of Symmetric Objects," IEEE Transactions on Image Processing, vol. 15, No. 12, Dec. 2006, pp. 3784-3790.

* cited by examiner

*Primary Examiner* — Katrina Fujita
(74) *Attorney, Agent, or Firm* — Yee & Associates, P.C.

(57) ABSTRACT

A method and apparatus for an image processing system is provided. A first image and a second image in a sequence of images are registered to a reference image in the sequence of images to form a first registered image and a second registered image, respectively. A double differenced image is formed using the reference image, the first registered image, and the second registered image. A number of moving target signatures in the double differenced image is identified. A moving target signature in the number of moving target signatures comprises a spot of a first type and at least one spot of a second type adjacent to the spot of the first type.

23 Claims, 6 Drawing Sheets

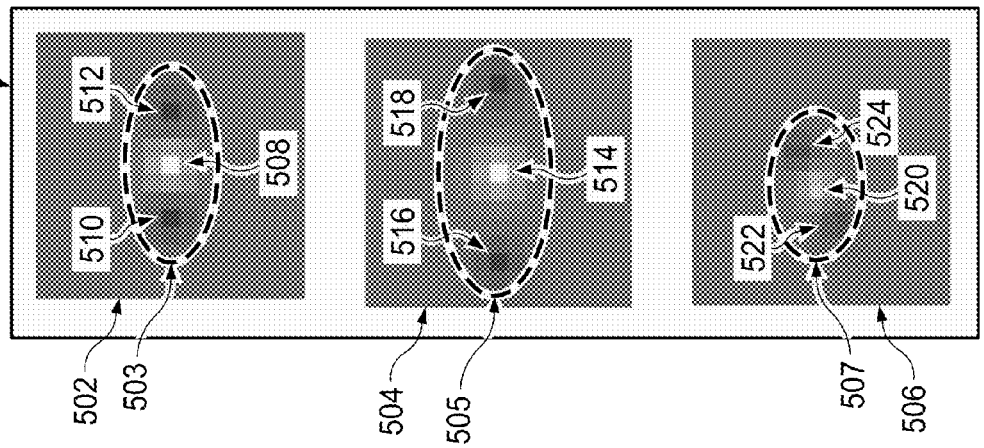
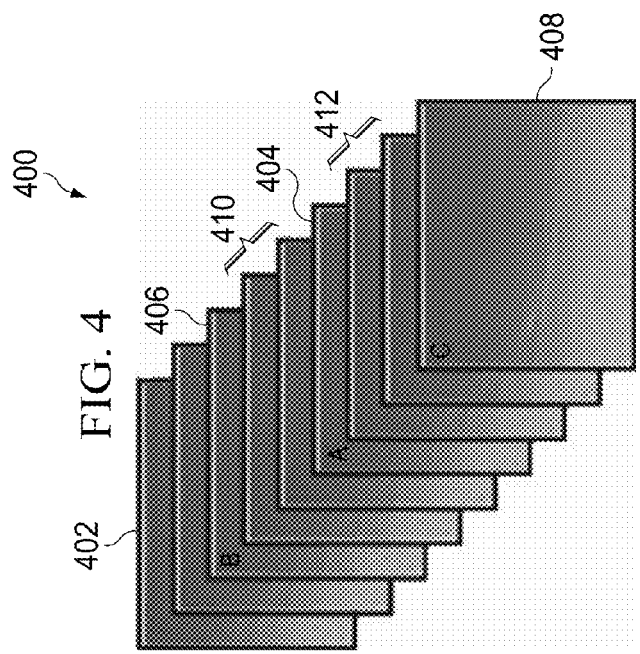

DISTINGUISHING BETWEEN MOVING TARGETS AND CLUTTER IN A VIDEO

BACKGROUND INFORMATION

1. Field

The present disclosure relates generally to processing images and, in particular, to processing images to detect target objects. Still more particularly, the present disclosure relates to a method and apparatus for distinguishing between a moving target object and clutter in a video.

2. Background

Target detection is the detection of one or more targets within a scene. The scene may be, for example, without limitation, a region of airspace, a city, a portion of a highway, an area in a field, an area over the ocean, or some other type of scene. A "target," as used herein, may be any object of interest within that scene. The object may be, for example, without limitation, a vehicle, a person, an aircraft, a missile, a tank, a ship, or some other type of object.

Oftentimes, images of the scene are used to perform target detection. The images used may include, for example, without limitation, electro-optical (EO) images of the scene, infrared (IR) images, radar images, and/or other types of images. Additionally, video of the scene is used for performing target detection. A video may be a sequence of images ordered with respect to time.

The target may appear as a point object in the image. In other words, the target may be a single pixel or only a small number of pixels that make the target unresolvable. In some situations, a target may be a moving target. A "moving target" may be any target that is moving relative to the background of the image. When the target is a moving target, video may be used to both detect the moving target and track the movement of the target over time.

However, detecting moving objects may be more difficult than desired in certain situations. For example, some currently available target detection systems may be unable to detect moving targets in a video when clutter is also present in the video. The clutter may include, for example, noise, artifacts, and/or other types of undesired indications or features in the video that do not represent a moving target or other objects of interest.

Some currently available target detection systems produce a higher rate of false detections than desired. As used herein, a "false detection" is a detection of a target that actually represents clutter instead of the target. Therefore, it would be desirable to have a method and apparatus that take into account at least some of the issues discussed above, as well as other possible issues.

SUMMARY

In one illustrative embodiment, a method is provided. A first image and a second image in a sequence of images are registered to a reference image in the sequence of images to form a first registered image and a second registered image, respectively. A double differenced image is formed using the reference image, the first registered image, and the second registered image. A number of moving target signatures in the double differenced image is identified. A moving target signature in the number of moving target signatures comprises a spot of a first type and at least one spot of a second type adjacent to the spot of the first type.

In another illustrative embodiment, an apparatus comprises a double differencer and a target detector. The double differencer is configured to register a first image and a second image in a sequence of images to a reference image in the sequence of images to form a first registered image and a second registered image, respectively. The double differencer is further configured to form a double differenced image using the reference image, the first registered image, and the second registered image. The target detector is configured to identify a number of moving target signatures in the double differenced image. A moving target signature in the number of moving target signatures comprises a spot of a first type and at least one spot of a second type adjacent to the spot of the first type.

In yet another illustrative embodiment, an image processing system comprises a double differencer, a reference vector generator, and a target detector. The double differencer is configured to register a first image and a second image in a sequence of images to a reference image in the sequence of images to form a first registered image and a second registered image, respectively. The double differencer is further configured to form a double differenced image using the reference image, the first registered image, and the second registered image. The reference vector generator is configured to form a set of reference vectors using a set of reference signatures. The set of reference signatures includes a reference clutter signature and a plurality of reference target signatures. The target detector is configured to identify a set of candidate regions in the double differenced image in which each of the set of candidate regions contains a candidate signature. The target detector is further configured to compute a complex moment vector for each of the set of candidate regions. The target detector is configured to determine whether the candidate signature in each of the candidate regions is a moving target signature or a clutter signature using the complex moment vector computed for each of the set of candidate regions and the set of reference vectors.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of a sequence of images in accordance with an illustrative embodiment;

FIG. 5 is an illustration of candidate signatures in accordance with an illustrative embodiment;

DETAILED DESCRIPTION

The illustrative embodiments recognize and take into account different considerations. For example, the illustrative embodiments recognize and take into account that it may be desirable to have a method for reducing clutter in the background of a video to improve the detection of a moving target. Further, the illustrative embodiments recognize and take into account that it may be desirable to have a method for determining whether a detection is actually the detection of a moving target or the detection of clutter. Thus, the illustrative embodiments provide a method for distinguishing between moving targets and clutter in a sequence of images.

Figure 1:
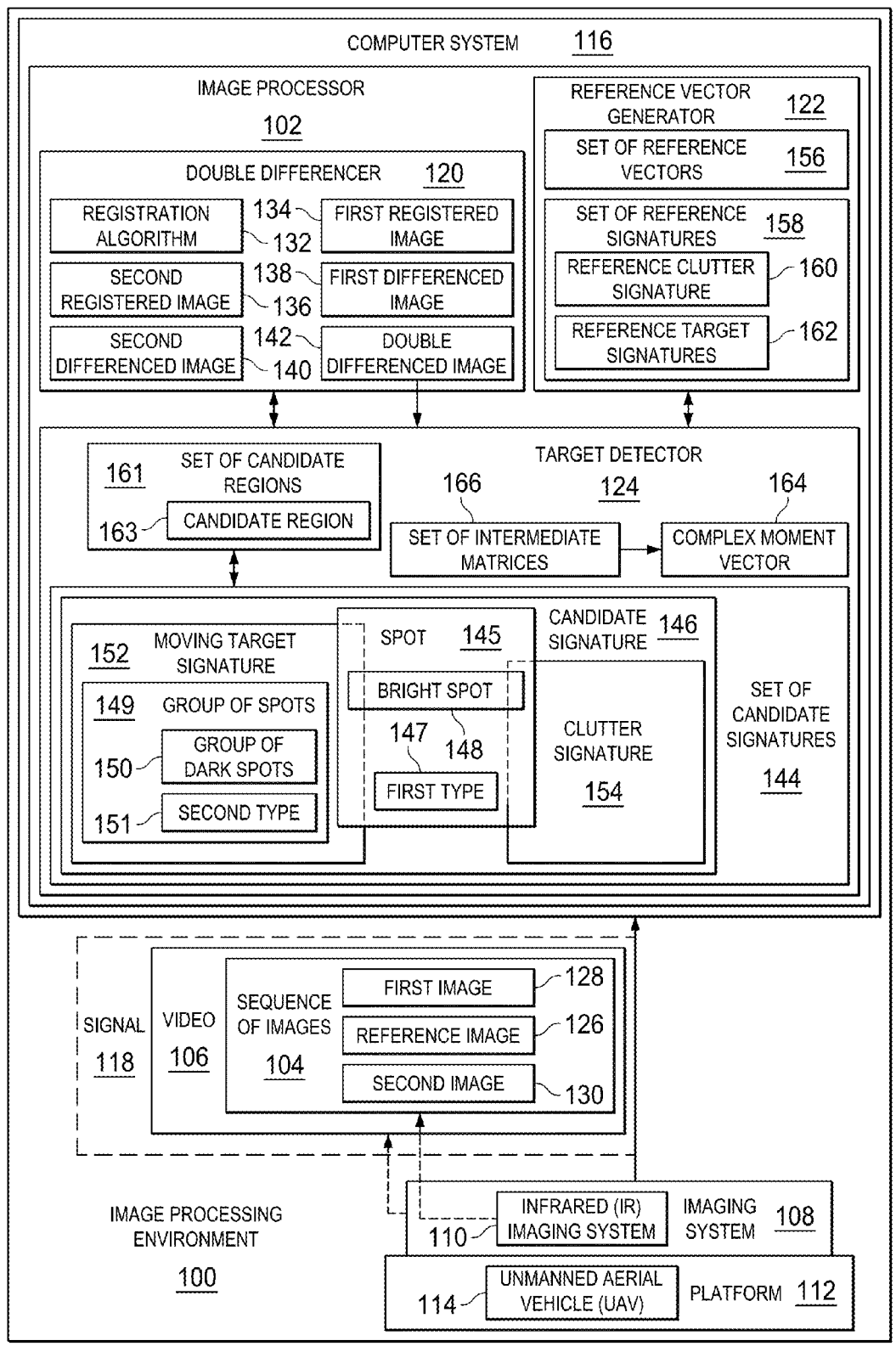
FIG. 1 is an illustration of an image processing environment in the form of a block diagram in accordance with an illustrative embodiment.

Referring now to the figures and, in particular, with reference to FIG. 1, an illustration of an image processing environment in the form of a block diagram is depicted in accordance with an illustrative embodiment. As depicted, the image processing environment 100 includes an image processor 102. The image processor 102 is configured to process a sequence of images 104.

As used herein, a "sequence of images," such as the sequence of images 104 in FIG. 1, may be two or more images ordered with respect to time. As depicted, the sequence of images 104 may form a video 106. In some cases, each image in the sequence of images 104 may be referred to as a frame or a video frame.

The sequence of images 104 may be generated by, for example, an imaging system 108. In one illustrative example, the imaging system 108 may take the form of an infrared (IR) imaging system 110. However, in other illustrative examples, the imaging system 108 may take the form of an electro-optical (EO) imaging system or some other type of imaging system.

Depending on the implementation, the imaging system 108 may be associated with a platform 112. As used herein, when one component is "associated" with another component, the association is a physical association in the depicted examples. For example, a first component, such as the imaging system 108, may be considered to be associated with a second component, such as the platform 112, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or as an extension of the second component.

Depending on the implementation, the platform 112 may be a mobile platform or a stationary platform. As depicted, the platform 112 may take the form of an unmanned aerial vehicle (UAV) 114. However, in other illustrative examples, the platform 112 may take some other form such as, for example, without limitation, an aircraft, a helicopter, a satellite, a space shuttle, a missile, a ship, a ground vehicle, a ground station, a tower, a building, a bridge, or some other type of platform.

In this illustrative example, the imaging system 108 may be in communication with the image processor 102. The image processor 102 may be implemented using hardware, software, or a combination of the two. For example, the image processor 102 may be implemented using a computer system 116. The computer system 116 may be comprised of one or more computers. When more than one computer is present in the computer system 116, these computers may be in communication with each other. In some cases, the image processor 102 may be implemented using a microprocessor, an integrated circuit, or some other type of device.

In one illustrative example, the image processor 102 may be implemented in a location remote to the platform 112. However, in other examples, the image processor 102 may be implemented within the platform 112.

The imaging system 108 is configured to send a signal 118 comprising the video 106 to the image processor 102. The signal 118 may be sent to the image processor 102 using any number of communications links. These communications links may include any number of wireless communications links, wired communications links, optical communications links, and/or other types of communications links.

In one illustrative example, the signal 118 is sent as the video 106 is being generated by the imaging system 108. In other illustrative examples, the imaging system 108 may send the video 106 to the image processor 102 after all of the video 106 has been generated. In some illustrative examples, the image processor 102 may be configured to retrieve portions of the video 106 at selected time intervals.

The image processor 102 includes a double differencer 120, a reference vector generator 122, and a target detector 124. The double differencer 120 is configured to reduce an amount of clutter in the video 106. As used herein, "clutter" may be any indication in an image that does not represent a moving target. In some cases, clutter may include the background of an image. Clutter may be caused by any number of factors. Clutter may be generated in response to, for example, without limitation, noise, atmospheric interface, wind, and/or other types of factors. Further, clutter may also include background such as, for example, the ground, the sky, brush, and/or other background features.

In this illustrative example, the double differencer 120 is configured to process the sequence of images 104 in the order that the images in the sequence of images 104 were generated. For example, the double differencer 120 identifies a reference image 126 in the sequence of images 104 for processing. When the double differencer 120 begins processing the sequence of images 104, the reference image 126 may be any image after the initial image generated in the sequence of images 104.

The double differencer 120 identifies the reference image 126 and a first image 128 that was generated prior to the reference image 126 and a second image 130 that was generated after the reference image 126 with respect to the order of the sequence of images 104. For example, without limitation, the first image 128 may be selected as the image in the sequence of images 104 that was generated prior to the reference image 126, while the second image 130 may be selected as the image in the sequence of images 104 that was generated after the reference image 126.

In this manner, the interval between the reference image 126 and the first image 128 and between the reference image 126 and the second image 130 may be the same. However, in other examples, the interval between the reference image 126 and the first image 128 may be different from the interval between the reference image 126 and the second image 130.

Once the reference image 126, the first image 128, and the second image 130 have been selected, the double differencer 120 uses a registration algorithm 132 to register these images.

In particular, the first image 128 is registered to the reference image 126 to form a first registered image 134. The second image 130 is registered to the reference image 126 to form a second registered image 136. As used herein, "registering" one image to another image means aligning a background of the image with the background in the other image.

The registration algorithm 132 used may comprise any number of currently available image registration methods and techniques. These image registration methods and techniques may include, for example, but are not limited to, intensity-based image registration, feature-based image registration, transformation model-based image registration, the random sample consensus (RANSAC) algorithm, and other types of image registration techniques.

The double differencer 120 is then configured to difference the first registered image 134 and the reference image 126 to form a first differenced image 138. Differencing the first registered image 134 and the reference image 126 substantially removes the background in the first differenced image 138. Further, the double differencer 120 differences the second registered image 136 and the reference image 126 to form a second differenced image 140. Differencing the second registered image 136 and the reference image 126 substantially removes the background in the second differenced image 140.

Next, the double differencer 120 sums the first differenced image 138 and the second differenced image 140 to form a double differenced image 142. In this manner, the reference image 126 may be double differenced with the first image 128 and the second image 130 to form the double differenced image 142. The target detector 124 is configured to use the double differenced image 142 to determine whether one or more moving targets are present in the reference image 126.

In particular, the target detector 124 is configured to detect a set of candidate signatures 144 within the double differenced image 142. As used herein, a "set of" items means zero or more items. In this manner, a set of items may be an empty or null set. For example, the set of candidate signatures 144 detected by the target detector 124 may be a null set.

A candidate signature 146 in the set of candidate signatures 144 may be an indication in the double differenced image 142 of a moving target. In this illustrative example, a candidate signature 146 comprises one spot 145 of a first type 147. When the sequence of images 104 generated by the imaging system 108 comprises infrared images, the first type 147 may be selected as, for example, having at least a selected level of brightness. In this manner, the spot 145 may be considered a bright spot 148.

The bright spot 148 may be an indication of the position of a moving target at the time the reference image 126 was generated. The bright spot 148 may comprise, for example, without limitation, one or more contiguous pixels having an intensity value greater than some selected threshold.

Additionally, the candidate signature 146 may include a group of spots 149 of a second type 151 located adjacent to the spot 145. When the sequence of images 104 generated by the imaging system 108 comprises infrared images, the second type 151 may be selected as, for example, having less than a selected level of brightness, which may also be referred to as having a selected level of darkness. In this manner, the group of spots 149 may be considered a group of dark spots 150 located adjacent to the bright spot 148. As used herein, a "group of" items means one or more items. In this manner, the group of dark spots 150 may be one or more dark spots.

Of course, in some cases, the sequence of images 104 generated by the imaging system 108 may not comprise infrared images. As one illustrative example, the sequence of images 104 may comprise electro-optical images.

In this illustrative example, the first type 147 may be selected as, for example, having a first color within a selected range. For example, the first type 147 may be having a blue color, a red color, a yellow color, a purple color, a white color, or some other type of color. In this manner, the spot 145 may be considered a colored spot. Further, the second type 151 may be selected as, for example, having a second color within a selected range that is different from the first color. In some cases, the second color may be any color that is different from the first color. In this manner, the group of spots 149 may be considered a group of different colored spots.

When a group of dark spots 150 is located adjacent to the bright spot 148, the candidate signature 146 is considered a moving target signature 152 that represents a moving target. When no dark spots are located adjacent to the bright spot 148, the candidate signature 146 is considered a clutter signature 154 that represents clutter and/or noise.

In these illustrative examples, the group of dark spots 150 may comprise one dark spot or two dark spots. For example, when a target has moved between the time at which the first image 128 was generated and the time at which the reference image 126 was generated, a dark spot occurs in the double differenced image 142. When a target has moved between the time at which the reference image 126 was generated and the time at which the second image 130 was generated, another dark spot occurs in the double differenced image 142.

Typically, when these two dark spots are present, these dark spots 150 are located symmetrically around the bright spot 148. In other words, these dark spots 150 may flank the bright spot 148. However, the position of the dark spots 150 relative to the bright spot 148 is determined by the velocity of the moving target and the path along which the moving target is moving.

The distance between the bright spot 148 and each of the dark spots 150 may be an indication of the velocity of the moving target. In particular, as the velocity of the moving target increases, the distance between the bright spot 148 and the dark spots 150 increases. The orientation of the dark spots 150 relative to the bright spot 148 may be an indication of the direction in which the moving target is moving.

When the set of candidate signatures 144 is not a null set, the target detector 124 is configured to determine which of these candidate signatures 144 represent moving targets and which of these candidate signatures 144 represent clutter. In particular, these determinations are made using a set of reference vectors 156 formed by reference vector generator 122. The set of reference vectors 156 may be generated and stored by the reference vector generator 122 prior to the processing of the sequence of images 104.

The reference vector generator 122 generates the set of reference vectors 156 using a set of reference signatures 158. The set of reference signatures 158 includes a reference clutter signature 160 and a plurality of reference target signatures 162. The reference clutter signature 160 may be a known signature for clutter. The reference target signatures 162 may be known signatures for moving targets. The reference target signatures 162 may include signatures for moving targets moving at selected velocities.

The reference vector generator 122 may generate the set of reference vectors 156 by computing the mean and variance of moment vectors for each of the set of reference signatures 158. The set of reference vectors 156 is then stored for use in classifying each of the set of candidate signatures 144 identified by the target detector 124.

The target detector 124 is configured to identify a set of candidate regions 161 in the double-differenced image 142 based on the detection of the set of candidate signatures 144. In particular, each of the set of candidate regions 161 may be a region of the double differenced image 142 containing a corresponding candidate signature in the set of candidate signatures 144. For example, the target detector 124 may identify the region in the double-differenced image 142 that contains the candidate signature 146 as the candidate region 163 for that candidate signature 146. In this manner, the candidate region 163 for the candidate signature 146 may be a subset of the double differenced image 142.

The target detector 124 is configured to compute a complex moment vector 164, which may be a vector of complex moment values, for each of the set of candidate regions 161. Consequently, a moment value may be generated for each of the set of candidate signatures 144 detected by the target detector 124.

The complex moment vector 164 may be computed based on the following:

$$B_N = \{c_{pq} c^k_{q0p0}\} \mid$$

$$\text{given: } c_{pq} = \sum_X \sum_y (x+iy)^p (x-iy)^q f(x, y)$$

$$\text{and } (p \geq q) \cap (p+q \leq r) \cap \left(k \equiv \frac{p-q}{N} \text{is an integer}\right)$$

where $B_N$ is the complex moment vector, N is level of symmetry, and p and q are moment orders up to r. In one illustrative example, N=2; $p_0$=0; $q_0$=2; and r=8. With these values, a vector of 15 complex moments may be generated. Other values for these parameters may be used in other illustrative examples. Further, x and y are the horizontal and vertical displacements in pixels from the central pixel location, and f(x,y) is the value of the pixels at the location (x,y).

The complex moment vector 164 may be used to make the set of candidate signatures 144 rotationally invariant. Further, the complex moment vector 164 may be used to account for the symmetry of the double differenced image 142.

A set of intermediate matrices 166, seen below, may be computed ahead of time prior to the processing of the double differenced image 142:

$$Mat_{x,y}^{pq} = (x+iy)^p (x-iy)^q$$

where $Mat_{x,y}^{pq}$ is one of the set of intermediate matrices 166, where x and y are the row index and column index offsets from the central pixel location, respectively, for the image, and where i is the imaginary number. Each of the set of intermediate matrices 166 corresponds to a value in the complex moment vector 164. In this manner, when 15 moment values are present in the complex moment vector 164, the set of intermediate matrices 166 may include 15 intermediate matrices.

Each moment value in the complex moment vector 164 is generated by multiplying the pixel value for each pixel in a candidate region 163 by a corresponding element in the intermediate matrix corresponding to the particular moment value. Thereafter, the results of these multiplications are summed to generate the moment value. This process is repeated using each of the set of intermediate matrices 166 to form the complex moment vector 164.

The target detector 124 compares the complex moment vector 164 identified to the set of reference vectors 156 to match each of the complex moment vector 164 to a corresponding reference vector. Based on the results of this matching, the target detector 124 determines whether a candidate signature 146 is a moving target signature 152 or a clutter signature 154.

The matching of the complex moment vector 164 to the set of reference vectors 156 may be performed using a number of pattern matching algorithms and/or techniques. For example, any one or more of the Mahalinobis distance, a neural network, a linear discriminant analysis (LDA), a support vector machine (SVM), or some other type of analysis may be used to match the complex moment vector 164 formed for each of set of candidate regions 161 to one of the set of reference vectors 156.

The process described above may be repeated for any number of images in the sequence of images 104. In this manner, one or more moving targets may be detected within the sequence of images 104 and tracked through the sequence of images 104.

The illustration of the image processing environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
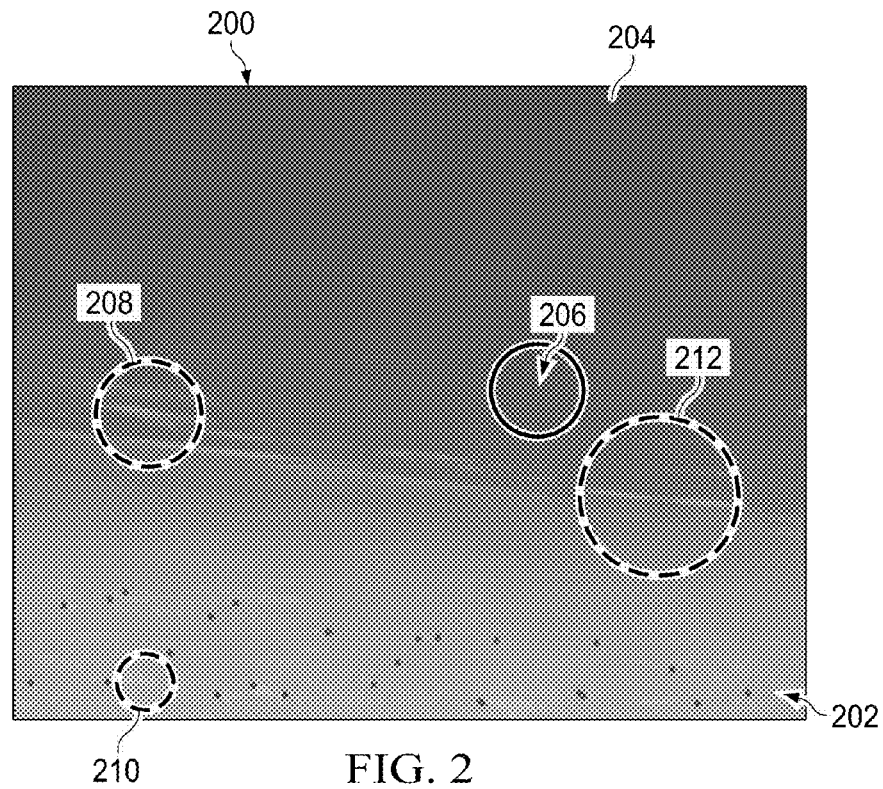
FIG. 2 is an illustration of an image in accordance with an illustrative embodiment.

With reference now to FIG. 2, an illustration of an image is depicted in accordance with an illustrative embodiment. In this illustrative example, the image 200 is an example of one implementation for an image in the sequence of images 104 in FIG. 1. As depicted, the image 200 in FIG. 2 includes the ground 202, the sky 204, and a moving target 206.

The encircled portions 208, 210, and 212 of the image 200 are the portions of the image 200 that may be mistakenly identified as including moving targets. However, these portions 208, 210, and 212 of the image 200 are indications of clutter.

Figure 3:
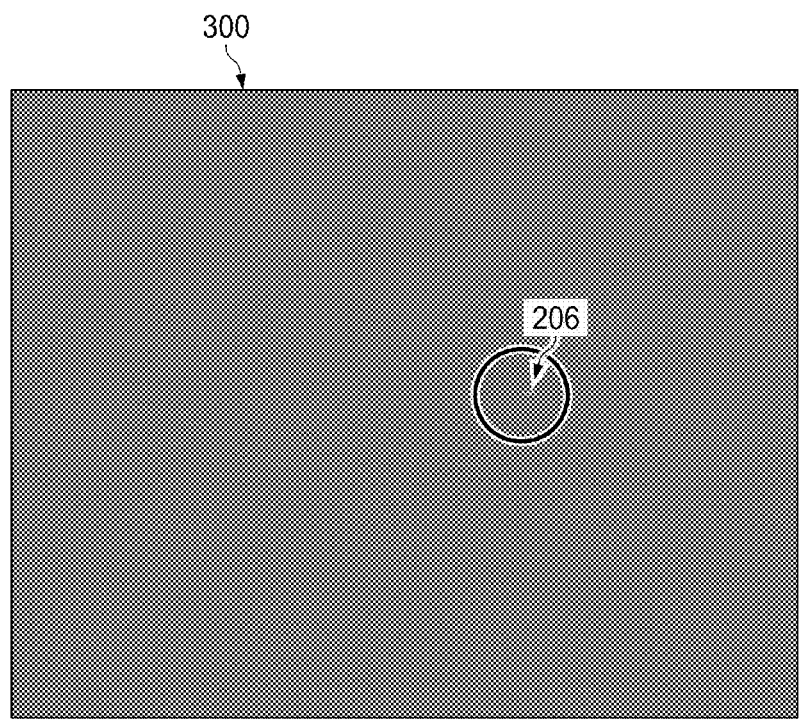
FIG. 3 is an illustration of a double differenced image in accordance with an illustrative embodiment.

Turning now to FIG. 3, an illustration of a double differenced image is depicted in accordance with an illustrative embodiment. In FIG. 3, the double differenced image 300 is an example of one implementation of the double differenced image 142 in FIG. 1. This double differenced image 300 may have been generated by double differencing the image 200 in FIG. 2 with a first image generated prior to the image 200 and a second image generated after the image 200.

As depicted, the moving target 206 may be clearly seen as the only moving target in the double differenced image 300. The portions 208, 210, and 212 of the image 200 in FIG. 2 may no longer be mistakenly considered as including moving targets.

With reference now to FIG. 4, an illustration of a sequence of images is depicted in accordance with an illustrative embodiment. In FIG. 4, the sequence of images 400 may be an example of one implementation for the sequence of images 104 in FIG. 1.

As depicted, the sequence of images 400 includes an initial image 402. A reference image 404 that occurs after the initial image 402 may be selected for processing. Further, a first image 406 that occurs prior to the reference image 404 and a second image 408 that occurs after the reference image 404 are also selected for processing. In particular, the interval 410 between the first image 406 and the reference image 404 is two images. The interval 412 between the reference image 404 and the second image 408 is two images. The reference image 404 may be double differenced with the first image 406 and the second image 408 to form a double differenced image such as, for example, the double differenced image 300 in FIG. 3.

Turning now to FIG. 5, an illustration of candidate signatures is depicted in accordance with an illustrative embodiment. In this illustrative example, the candidate regions 500 depicted may be the regions of double differenced images in which candidate signatures have been identified.

As depicted, the candidate regions 500 include a first candidate region 502, a second candidate region 504, and a third candidate region 506. The first candidate region 502, the second candidate region 504, and the third candidate region 506 include a first candidate signature 503, a second candidate signature 505, and a third candidate signature 507, respectively. Each of these three candidate signatures represents a moving target.

The first candidate signature 503 comprises bright spot 508 flanked by dark spot 510 and dark spot 512. The second candidate signature 505 comprises bright spot 514 flanked by dark spot 516 and dark spot 518. The third candidate signature 507 comprises bright spot 520 flanked by dark spot 522 and dark spot 524.

Figure 6:
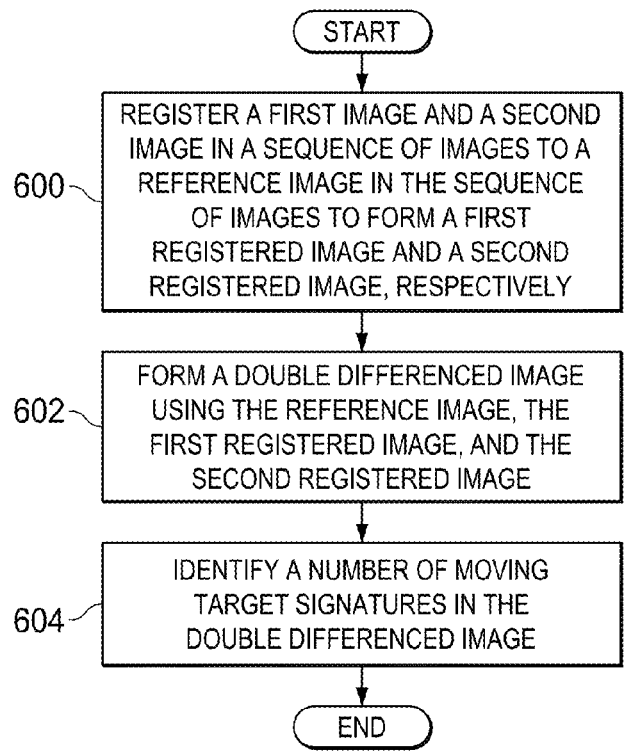
FIG. 6 is an illustration of a process for detecting moving targets in a sequence of images in the form of a flowchart in accordance with an illustrative embodiment.

With reference now to FIG. 6, an illustration of a process for detecting moving targets in a sequence of images is depicted in the form of a flowchart in accordance with an illustrative embodiment. The process illustrated in FIG. 6 may be implemented using the image processor 102 in FIG. 1.

The process begins by registering a first image and a second image in a sequence of images to a reference image in the sequence of images to form a first registered image and a second registered image, respectively (operation 600). The first image may be an image generated prior to the reference image in the sequence of images. The second image may be an image generated after the reference image in the sequence of images.

Next, a double differenced image is formed using the reference image, the first registered image, and the second registered image (operation 602). Thereafter, a number of moving target signatures are identified in the double differenced image (operation 604), with the process terminating thereafter. In this illustrative example, a moving target signature in the number of moving target signatures comprises a bright spot and at least one dark spot adjacent to the bright spot.

Figure 7:
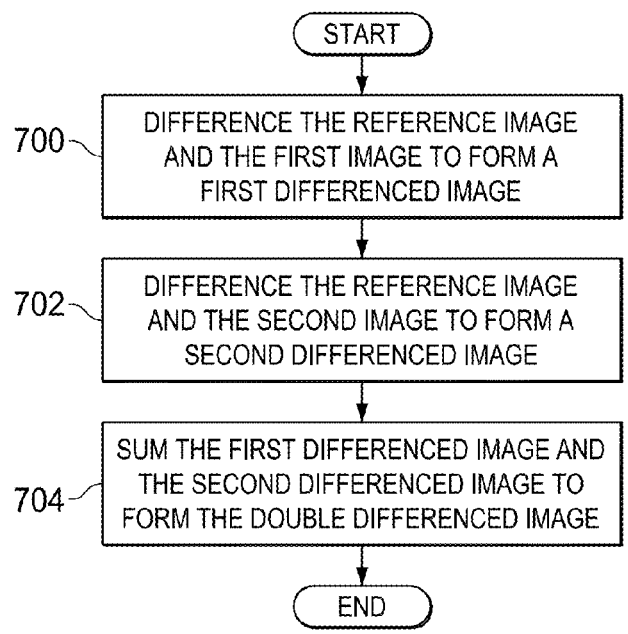
FIG. 7 is an illustration of a process for forming a double differenced image in the form of a flowchart in accordance with an illustrative embodiment.

With reference now to FIG. 7, an illustration of a process for forming a double differenced image is depicted in the form of a flowchart in accordance with an illustrative embodiment. The process illustrated in FIG. 7 may be used to implement operation 602 in FIG. 6.

The process begins by differencing the reference image and the first image to form a first differenced image (operation 700). Next, the process differences the reference image and the second image to form a second differenced image (operation 702). The process then sums the first differenced image and the second differenced image to form the double differenced image (operation 704), with the process terminating thereafter.

Figure 8:
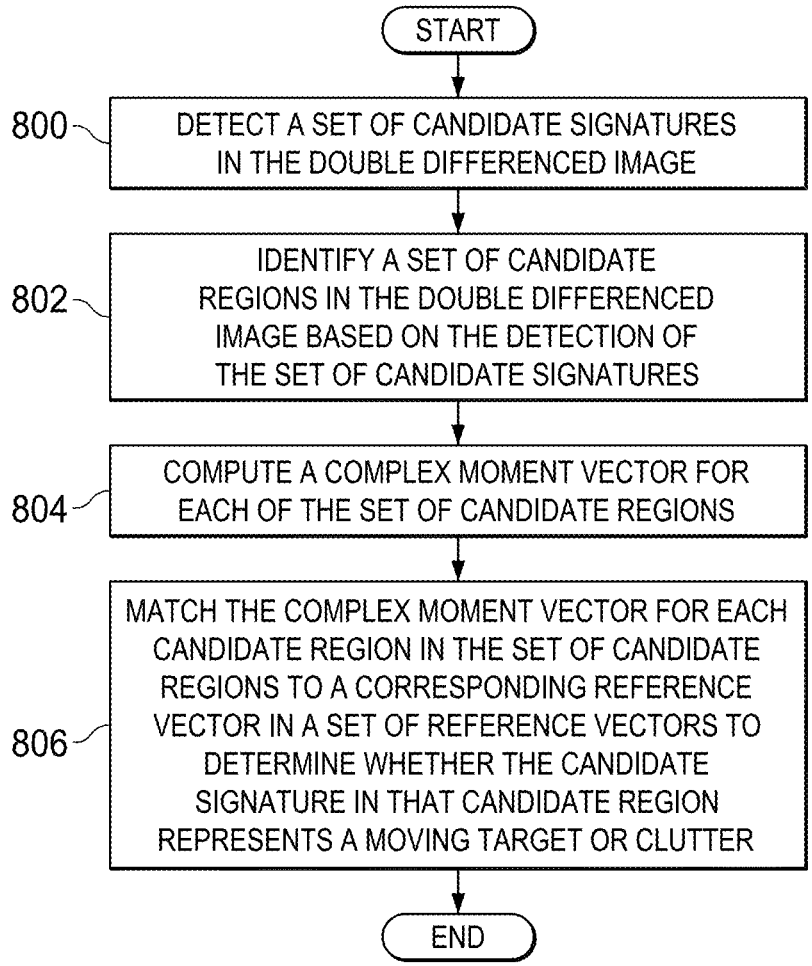
FIG. 8 is an illustration of a process for identifying a number of moving target signatures in the form of a flowchart in accordance with an illustrative embodiment.

With reference now to FIG. 8, an illustration of a process for identifying a number of moving target signatures is depicted in the form of a flowchart in accordance with an illustrative embodiment. The process illustrated in FIG. 8 may be used to implement operation 604 in FIG. 6.

The process begins by detecting a set of candidate signatures in the double differenced image (operation 800). Next, the process identifies a set of candidate regions in the double differenced image based on the detection of the set of candidate signatures (operation 802).

Thereafter, the process computes a complex moment vector for each of the set of candidate regions (operation 804). The process then matches the complex moment vector for each candidate region in the set of candidate regions to a corresponding reference vector in a set of reference vectors to determine whether the candidate signature in that candidate region represents a moving target or clutter (operation 806), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
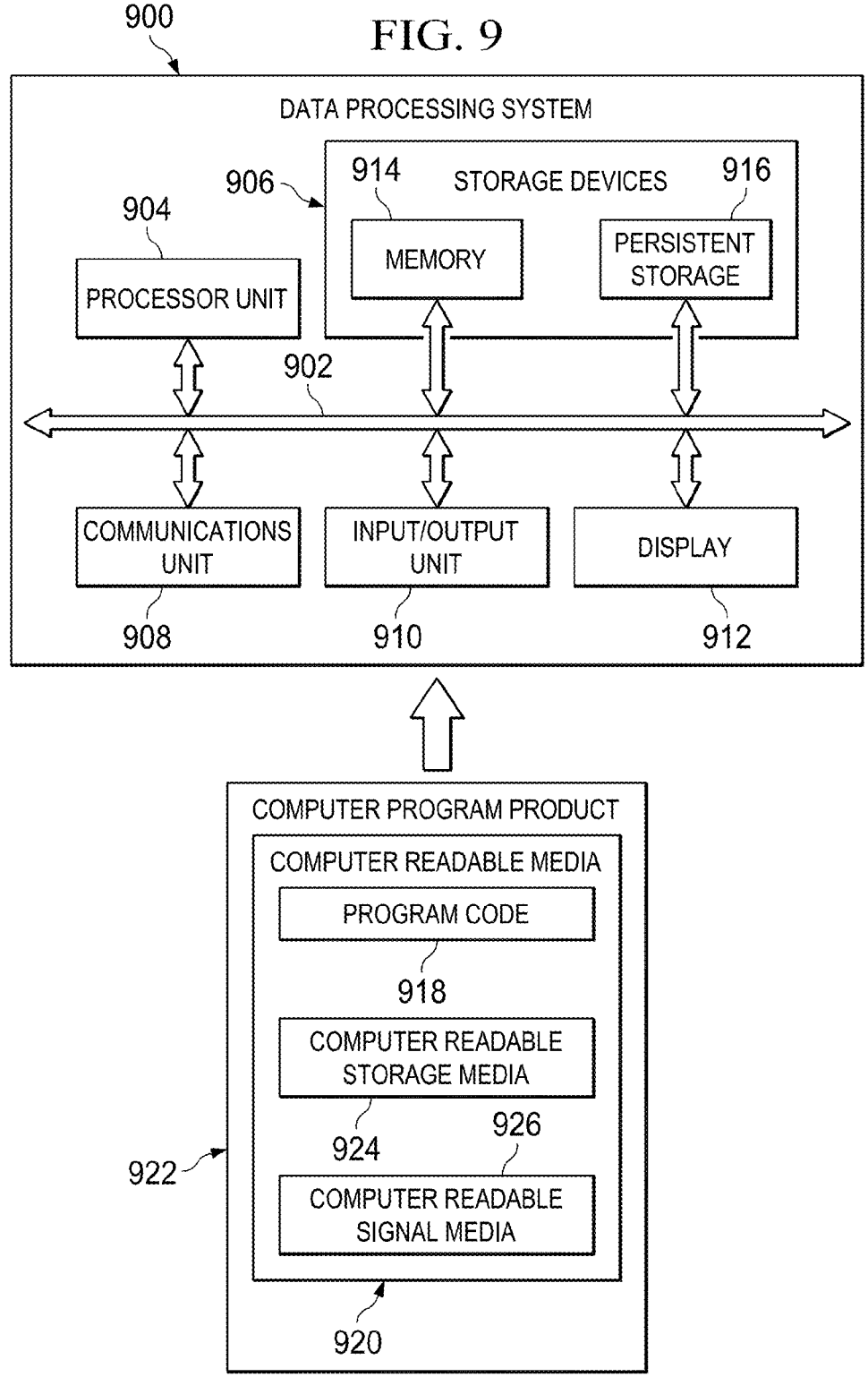
FIG. 9 is an illustration of a data processing system in the form of a block diagram in accordance with an illustrative embodiment.

Turning now to FIG. 9, an illustration of a data processing system in the form of a block diagram is depicted in accordance with an illustrative embodiment. The data processing system 900 may be used to implement one or more computers in the computer system 116 in FIG. 1. As depicted, the data processing system 900 includes a communications framework 902, which provides communications between a processor unit 904, storage devices 906, a communications unit 908, an input/output unit 910, and a display 912. In some cases, communications framework 902 may be implemented as a bus system.

The processor unit 904 is configured to execute instructions for software to perform a number of operations. The processor unit 904 may comprise a number of processors, a multi-processor core, and/or some other type of processor, depending on the implementation. In some cases, the processor unit 904 may take the form of a hardware unit, such as a circuit system, an application specific integrated circuit (ASIC), a programmable logic device, or some other suitable type of hardware unit.

Instructions for the operating system, applications, and/or programs run by the processor unit 904 may be located in the storage devices 906. The storage devices 906 may be in communication with the processor unit 904 through the communications framework 902. As used herein, a "storage device", also referred to as a computer readable storage device, is any piece of hardware capable of storing information on a temporary and/or permanent basis. This information may include, but is not limited to, data, program code, and/or other information.

A memory 914 and a persistent storage 916 are examples of the storage devices 906. The memory 914 may take the form of, for example, a random access memory or some type of volatile or non-volatile storage device. The persistent storage 916 may comprise any number of components or devices. For example, the persistent storage 916 may comprise a hard drive, a flash memory, a rewritable optical disk, a rewritable magnetic tape, or some combination of the above. The media used by the persistent storage 916 may or may not be removable.

The communications unit 908 allows the data processing system 900 to communicate with other data processing systems and/or devices. The communications unit 908 may provide communications using physical and/or wireless communications links.

The input/output unit 910 allows input to be received from and output to be sent to other devices connected to the data processing system 900. For example, the input/output unit 910 may allow user input to be received through a keyboard, a mouse, and/or some other type of input device. As another example, the input/output unit 910 may allow output to be sent to a printer connected to the data processing system 900.

The display 912 is configured to display information to a user. The display 912 may comprise, for example, without limitation, a monitor, a touch screen, a laser display, a holographic display, a virtual display device, and/or some other type of display device.

In this illustrative example, the processes of the different illustrative embodiments may be performed by the processor unit 904 using computer-implemented instructions. These instructions may be referred to as program code, computer usable program code, or computer readable program code and may be read and executed by one or more processors in the processor unit 904.

In these examples, a program code 918 is located in a functional form on a computer readable media 920, which is selectively removable, and may be loaded onto or transferred to the data processing system 900 for execution by the processor unit 904. The program code 918 and the computer readable media 920 together form a computer program product 922. In this illustrative example, the computer readable media 920 may be a computer readable storage media 924 or a computer readable signal media 926.

The computer readable storage media 924 is a physical or tangible storage device used to store the program code 918 rather than a medium that propagates or transmits the program code 918. The computer readable storage media 924 may be, for example, without limitation, an optical or magnetic disk or a persistent storage device that is connected to the data processing system 900.

Alternatively, the program code 918 may be transferred to the data processing system 900 using the computer readable signal media 926. The computer readable signal media 926 may be, for example, a propagated data signal containing the program code 918. This data signal may be an electromagnetic signal, an optical signal, and/or some other type of signal that can be transmitted over physical and/or wireless communications links.

The illustration of the data processing system 900 in FIG. 9 is not meant to provide architectural limitations to the manner in which the illustrative embodiments may be implemented. The different illustrative embodiments may be implemented in a data processing system that includes components in addition to or in place of those illustrated for the data processing system 900. Further, components shown in FIG. 9 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   registering a first image and a second image in a sequence of images to a reference image in the sequence of images to form a first registered image and a second registered image, respectively;
   forming a double differenced image using the reference image, the first registered image, and the second registered image; and
   identifying a number of moving target signatures in the double differenced image, wherein a moving target signature in the number of moving target signatures comprises a spot of a first type and at least one spot of a second type adjacent to the spot of the first type;
   wherein the spot of the first type is a bright spot;
   wherein the at least one spot of the second type is a group of dark spots;
   wherein distance between the bright spot and the dark spots indicates a velocity of a moving target associated with the moving target signature; and
   wherein the group of dark spots comprises two dark spots located symmetrically around the bright spot.

2. The method of claim 1, wherein registering the first image and the second image in the sequence of images to the reference image in the sequence of images comprises:
   aligning a background in the first image with the background in the reference image to form the first registered image; and
   aligning the background in the second image with the background in the reference image to form the second registered image.

3. The method of claim 2, wherein forming the double differenced image using the reference image, the first registered image, and the second registered image comprises:
   differencing the first registered image and the reference image to form a first differenced image in which the background is substantially removed in the first differenced image; and
   differencing the second registered image and the reference image to form a second differenced image in which the background is substantially removed in the second differenced image.

4. The method of claim 3, wherein forming the double differenced image using the reference image, the first registered image, and the second registered image further comprises:
   summing the first differenced image and the second differenced image to form the double differenced image.

5. The method of claim 1, wherein identifying the number of moving target signatures in the double differenced image comprises:
   detecting a set of candidate signatures in the double differenced image.

6. The method of claim 5, wherein identifying the number of moving target signatures in the double differenced image further comprises:
   identifying a set of candidate regions in the double differenced image in which each of the set of candidate regions is a region of the double differenced image containing a corresponding candidate signature in the set of candidate signatures.

7. The method of claim 6, wherein identifying the number of moving target signatures in the double differenced image further comprises:
   computing a complex moment vector for a candidate region in the set of candidate regions; and
   determining whether a candidate signature corresponding to the candidate region is a moving target signature by comparing the complex moment vector to a set of reference vectors.

8. The method of claim 7 further comprising:
   forming the set of reference vectors using a set of reference signatures that includes a reference clutter signature and a plurality of reference target signatures.

9. The method of claim 8, wherein forming the set of reference vectors comprises:
   computing a mean and a variance of moment vectors for each of the set of reference signatures to form the set of reference vectors.

10. The method of claim 7,
    wherein the complex moment vector is computed based on the following:

$$B_N = \{c_{pq} c_{q0p0}^k\} \mid$$

given: $c_{pq} = \sum_X \sum_y (x+iy)^p (x-iy)^q f(x, y)$ and $(p \geq q) \cap (p+q \leq r) \cap \left(k \equiv \frac{p-q}{N} \text{ is an integer}\right)$ where $B_N$ is the complex moment vector, N is level of symmetry, and p and q are moment orders up to r.

11. The method of claim 10,
    wherein the complex moment vector is computed using a set of intermediate matrices that are pre-computed:

$$Mat_{x,y}^{pq} = (x+iy)^p (x-iy)^q$$

where $Mat_{x,y}^{pq}$ is one of the set of intermediate matrices, where x and y are row index and column index offsets from a central pixel location, respectively, where i is the imaginary number, and each of the set of intermediate matrices corresponds to a value in the complex moment vector.

12. The method of claim 1,
    wherein the spot of the first type
       has at least a first level of brightness, and
       comprises one or more contiguous pixels having an intensity value greater than a threshold;
    wherein the at least one spot of the second type
       has less than a second level of brightness, which is a level of darkness;
    wherein positions of the dark spots relative to the bright spot is determined by a velocity of a moving target associated with the moving target signature and a path along which the moving target is moving;
    wherein as the velocity of the moving target increases the distance between the bright spot and the dark spots increases; and
    wherein an orientation of the dark spots relative to the bright spot indicate a direction in which the moving target is moving.

13. An apparatus comprising:
    a processor unit of a computer system, the computer system configured to:
       register a first image and a second image in a sequence of images to a reference image in the sequence of images to form a first registered image and a second registered image, respectively, and
       form a double differenced image using the reference image, the first registered image, and the second registered image; and
       identify a number of moving target signatures in the double differenced image, wherein a moving target signature in the number of moving target signatures comprises a spot of a first type and at least one spot of a second type adjacent to the spot of the first type;
    wherein the spot of the first type is a bright spot;
    wherein the at least one spot of the second type is a group of dark spots;
    wherein distance between the bright spot and the dark spots indicates a velocity of a moving target associated with the moving target signature; and
    wherein the group of dark spots comprises two dark spots located symmetrically around the bright spot.

14. The apparatus of claim 13, wherein the computer system is further configured to align a background in the first image with the background in the reference image to form the first registered image and align the background in the second image with the background in the reference image to form the second registered image.

15. The apparatus of claim 14, wherein the computer system is further configured to difference the first registered image and the reference image to form a first differenced image in which the background is substantially removed in the first differenced image and difference the second registered image and the reference image to form a second differenced image in which the background is substantially removed in the second differenced image.

16. The apparatus of claim 15, wherein the computer system is further configured to sum the first differenced image and the second differenced image to form the double differenced image.

17. The apparatus of claim 13, wherein the computer system is configured to detect a set of candidate signatures in the double differenced image.

18. The apparatus of claim 17, wherein a candidate signature is one of a moving target signature and a clutter signature in which the clutter signature comprises one spot of the first type and no spots of the second type adjacent to the one spot of the first type.

19. The apparatus of claim 17, wherein the computer system is further configured to identify a set of candidate regions in the double differenced image in which each of the set of candidate regions is a region of the double differenced image containing a corresponding candidate signature in the set of candidate signatures.

20. The apparatus of claim 19, wherein the computer system is further configured to compute a complex moment vector for a candidate region in the set of candidate regions and determine whether a candidate signature corresponding to the candidate region is a moving target signature by comparing the complex moment vector to a set of reference vectors.

21. The apparatus of claim 20, wherein the computer system is further configured to form the set of reference vectors using a set of reference signatures that includes a reference clutter signature and a plurality of reference target signatures.

22. The apparatus of claim 21, wherein the computer system is configured to compute a mean and a variance of moment vectors for each of the set of reference signatures to form the set of reference vectors.

23. An image processing system of a computer system, the computer system comprising:

a processor unit;

wherein the computer system is configured to:

register a first image and a second image in a sequence of images to a reference image in the sequence of images to form a first registered image and a second registered image, respectively;

form a double differenced image using the reference image, the first registered image, and the second registered image;

form a set of reference vectors using a set of reference signatures in which the set of reference vectors includes a reference clutter signature and a plurality of reference target signatures;

identify a set of candidate regions in the double differenced image in which each of the set of candidate regions contains a candidate signature;

compute a complex moment vector for each of the set of candidate regions; and determine whether the candidate signature in each of the candidate regions is a moving target signature or a clutter signature using the complex moment vector computed for each of the set of candidate regions and the set of reference vectors;

wherein the moving target signature comprises a spot of a first type and at least one spot of a second type adjacent to the spot of the first type;

wherein the spot of the first type is a bright spot;

wherein the at least one spot of the second type is a group of dark spots;

wherein distance between the bright spot and the dark spots indicates a velocity of a moving target associated with the moving target signature; and wherein the group of dark spots comprises two dark spots located symmetrically around the bright spot.

* * * * *